United States Patent [19]
Le Carvennec

[11] 3,774,043
[45] Nov. 20, 1973

[54] CAMERA SYSTEM UTILISING A PYROELECTRIC TARGET

[75] Inventor: Francois Le Carvennec, Paris, France

[73] Assignee: Thomson-CSF, Paris, France

[22] Filed: Apr. 12, 1972

[21] Appl. No.: 243,210

[30] Foreign Application Priority Data
May 14, 1971 France .................... 7117556

[52] U.S. Cl. ............... 250/330, 250/333, 250/334
[51] Int. Cl. .............................................. G01j 1/02
[58] Field of Search ............... 250/83.3 HP, 330, 250/333, 334

[56] References Cited
UNITED STATES PATENTS
3,629,499  12/1971  Carlson .............. 250/83.3 HP X
3,067,283  12/1962  Petritz et al. ........ 250/83.3 HP X
3,483,320  12/1969  Gebel ................. 250/83.3 HP X Primary Examiner—Archie R. Borchelt
Attorney—John W. Malley et al.

[57] ABSTRACT

In camera systems utilising pyroelectric targets periodically masked to the incident radiation by means of a shutter and alternately scanned with a slow read-out electron beam and a fast electron beam, the invention adds an element for ensuring a second slow electron scanning after the end of the fast electron scanning and up to the commencement of that phase of the shutter cycle during which the slow read-out electron scanning takes place.

5 Claims, 2 Drawing Figures

PATENTED NOV 20 1973 3,774,043
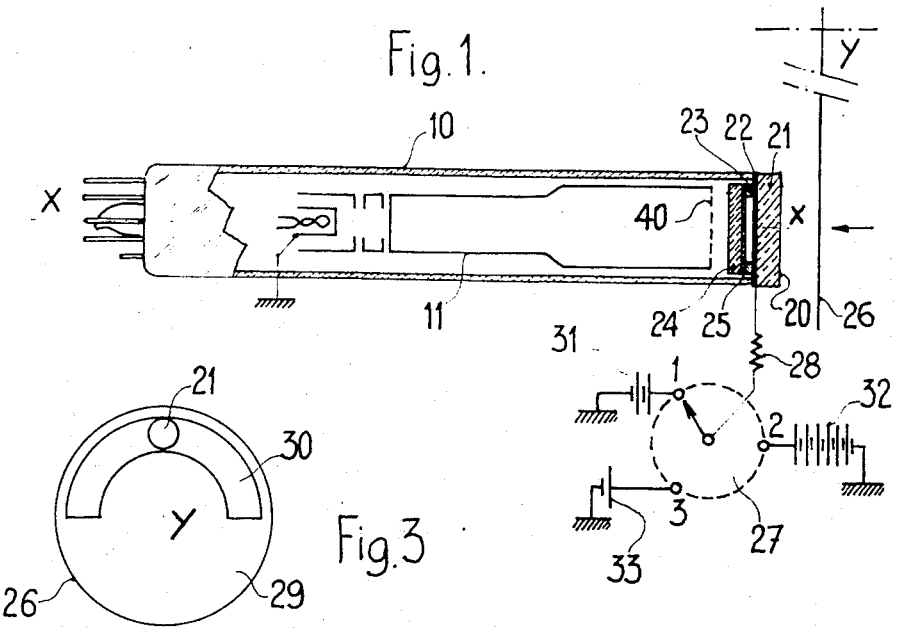
Fig.1.
Fig.3
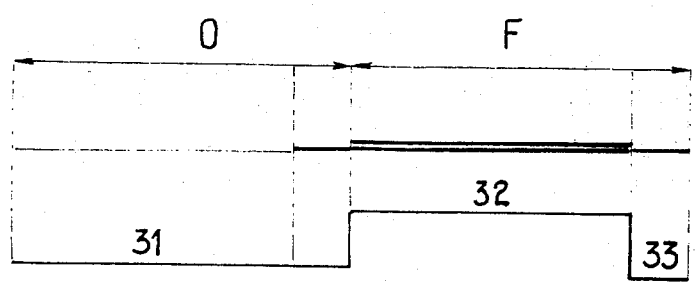
Fig.2

CAMERA SYSTEM UTILISING A PYROELECTRIC TARGET

The present invention relates to an improved camera system with a pyroelectric target.

Those skilled in the art will appreciate that pyroelectric targets for camera tubes are essentially constituted by material which has the property that at all points on it, it has an electric polarisation which is a function of the temperature at this point. The polarisation more especially concerned here, is that which appears in the body of the target in the direction of its thickness.

These targets, when exposed to radiation emitted by an object, make it possible, thanks to this property, to obtain an image under the effect of the variation in temperature produced by the incident radiation at each point on them.

In use, these targets generally have an electrically conductive layer on one of their faces whilst a read-out electron beam scans their other face.

These targets have the property of being sensitive to a very wide spectrum, the sole condition imposed on the radiation to which they are exposed being, as aforestated, that this radiation should produce a variation in temperature at its point of impact on the target. The targets are particularly sensitive to infra-red radiation and consequently enable unlighted objects to be detected, purely by virtue of the radiation which they emit.

The mechanism of operation of these targets is as follows :

Incident radiation striking the target at a given point, produces at this point a variation in the temperature of the material of which the target is made up, which variation is related to the energy of the incident radiation. This temperature variation in turn results in a variation in the intensity of the electric polarisation vector in the direction of the thickness of the target, at this point, that is to say results in the appearance at this point of two equal, positive and negative charges at the respective two faces of the target. This is the pyroelectric phenomenon. The electron beam, under certain conditions, is able to neutralise these charges and to collect a read-out signal which is associated with the value of the incident radiation which has resulted in the appearance of the charges ; this signal is picked off across the terminals of a resistor connected in series between the gun producing the electron beam, and the conductive layer.

Read-out is effected as follows :

The gun dispatches towards the target a beam of slow electrons which are deposited there until they neutralise the positive charges accumulated at this point under the effect of the incident radiation. It has been assumed that the charges accumulated at this point on the face of the target, are positive charges which can be neutralised by the negative ones introduced by the electron gun. The case of negative charges will be investigated at a later point. After read-out, the scanned point is then at a potential close to that of the cathode of the gun.

Next time the read-out beam passes over the same point, and assuming that the material of the target is a sufficiently good insulator so that between two scans by the beam, there is no appreciable loss through the body of the material, there can only be a fresh signal if, in the intervening time, the electric polarisation of the target at this point is changed, that is to say if, during the time separating the two scans, a variation in the target temperature at this point has taken place, resulting in a variation in the quantity of charges which have developed at this point.

In particular in the case of fixed objects emitting radiation of constant intensity, this condition ceases to hold from the instant at which thermal equilibrium of the target, under the effect of the radiation, is achieved, that is to say at which its temperature ceases to vary. Scanning then ceases to produce an image.

This is why the read-out devices of pyroelectric targets furthermore comprise a shutter arranged in the trajectory of the incident radiation in order to intercept same between two successive scans by the read-out beam over one and the same point on the target, and thus to vary the electric polarisation of the target at this point, between two scans.

However, the use of this kind of shutter has the effect of producing at different points on the target, variations in temperature between the instant at which the shutter is opened and that at which it is closed. These variations, which are in opposite senses, are translated by variations in opposite senses of the quantities of charges appearing at the point in question, between the instant at which said point is exposed to the radiation and that at which the radiation is cut off.

The beam of slow electrons, which can only transfer negative charges, can only compensate for one of these two variations, namely that which is translated by an increase in the quantity of positive charges appearing at the scanned point.

It is therefore necessary to associate with the shutter means for utilising negative charges too, and these means cannot of course be the slow electrons of the aforesaid electron gun, as the earlier explanation has shown.

In order to neutralise these negative charges, one prior art solution consists in using an electron-gun producing high-energy electrons, i.e electrons of high velocity which, on impact with the target, can produce secondary emission from same with a coefficient higher than unity. Among the pyroelectric materials currently in use for the manufacture of targets, materials possessing this property can readily be found, for example, there is TGS (triglycine sulphate).

In accordance with one prior art proposal the same electron-gun produces both the slow electrons and the high-energy electrons or fast electrons hereinbefore referred to, depending upon the accelerating voltage which is applied between the electron-gun and that surface of the target with which the electrons collide. In this case, the accelerating voltage generally varies during the course of the scanning of the target, in accordance with squarewave pattern ranging between the voltage level (low voltage) corresponding to the slow electrons, and that corresponding to the fast electrons (high voltage). These voltage variations are synchronised with the shutter operation phases, the term phases being intended here to indicate the times during which the shutter is respectively open and closed.

However, it appears that the equilibrium potential of the surface of an insulating component which is the source of a secondary emission phenomenon with an emission coefficient of greater than unity, exhibits poor regulation. In the above-described two-voltage scanning system, this drawback necessarily arises at the end of the high voltage phase of the scanning function.

The object of the present invention is a camera tube equipped with means to overcome this drawback.

According to the invention, there is provided a camera system comprising a pyroelectric target exposed to incident radiation and read out by being scanned by a beam of slow read-out electrons, said scanning alternating with scanning by a fast electron beam in a cycle regulated in accordance with the cycle of a shutter arranged in front of the target and masking same from the incident radiation during the obturation phase of said cycle and uncovering it during the open phase, said slow electron scan occuring in one of said phases and the fast electron scan in the other, characterized in that means are provided to effect a second slow electron scan of said target after the end of the fast electron scan at least up to the commencement of that period of the shutter cycle during which the slow electron scan for read-out purposes takes place.

The invention will be better understood from a consideration of the ensuring description and the attached figures in which:

FIG. 1 is a schematic assembly view of the camera system and pyroelectric target, in accordance with the invention;

FIG. 2 is an explanatory diagram relating to the system shown in FIG. 1 ; and

FIG. 3 is an example of one of the components in the system shown in FIG. 1.

In FIG.1, an insulating envelope 10 of glass, for example, and, inside it, an electron-gun for the producing of an electron beam, can be seen. The electron-gun is composed, in the conventional way, of several components which have not been indicated separately, the gun being indicated in toto by the reference 11. The electron beam produced by the gun is directed towards that end 20 of the envelope where a camera target is situated which will be discussed in more detail hereinafter. In the trajectory of the electron beam, means are arranged (not shown), which, in accordance with prior art techniques, enable the beam to be deflected in order to make it strike any desired point at said end.

At the end 20, the envelope 10 is closed off in a sealed fashion by means of a plate 21 transparent to the radiation (arrow) coming from the object being observed. This plate, covered on its internal face with a layer 22 of electrically conductive material, carries spots 23 which are likewise electrically conductive. On these spots or studs there rests a target 24 made of a pyroelectric material sensitive to the incident radiation, having a face in contact with said spots which carries an electrically conductive coating 25. The radiation in question may be infra-red or any other radiation capable of impressing the pyroelectric target, that is to say of causing its electric polarisation to vary in a sensitive manner. A diaphragm or shutter 26 arranged in the trajectory of the incident radiation, beyond the end 20 of the envelope, makes it possible to periodically intercept the radiation coming from the object.

A three-position switch 27 makes it possible, on the other hand, to connect the conductive layer 22 across a resistor 28 successively to three potential sources 31, 32 and 33, of dissimilar values, the two sources 31 and 33 furnishing a low voltage while the source 32 furnishes a high voltage.

The negative terminal of each of these sources is connected to ground as is the cathode of the electron-gun, as shown in FIG. 1. The electrons issuing from the electron-gun are accelerated to a high velocity (fast electrons) while the high voltage of the source 32 is applied to the layer 22, and to a low velocity (slow electrons) whilst the low voltage of the sources 31 and 33 is applied to said layer.

From the foregoing, we have seen how synchronising of the actions of shutter 26 and switch 27, enables the read-out of the various points on the target scanned by the electron beam, to take place in all cases, provided that between two scans of one and the same point on the target by the electron beam, said point has been cooled or heated; the scanning function utilising the slow electron beam when the charges to be neutralised are positive ones, and the fast electron beam when they are negative ones. In this latter case, the fast electron beam acts, as already stated, to produce the emission of secondary electrons at the point of its impact on the target. These secondary electrons are collected, under conditions well known from the prior art, by the collector 40 shown in FIG. 1, in the form of a grid.

In order to provide a more concrete idea of what is involved we will assume by way of non-limitative example that the shutter 26 consists of a metal plate 29 containing a slot 30 in the form of half a circular arc, as FIG. 3 shows. This plate which is parallel to the insulating plate 21 rotates around its Y axis, parallel to the axis XX of the tube, with a uniform motion imparted to it by a device (not shown) at the rate for example of one revolution every 240 milliseconds, the target 24 being exposed to the incident radiation (open phase) during half this time and cut off from the radiation (closed phase) during the other half.

These two phases have been illustrated in the diagram of FIG. 2 (topmost line), respectively, by the symbols O and F, covering the full cycle of motion of the shutter, plotted on the abscissa.

In this figure (broken line at the bottom), there have been plotted on the ordinates, the voltages successively applied to the conductive layer 22 during said cycle, these voltages being indicated by the same reference numerals as the sources by which they are produced.

Finally, in the same figure (central line) the times during which the target is scanned by the electron beam, have been indicated ; these times correspond to the thick drawn portions of this line, thick single lines for the scannings by slow electrons and thick double lines for the scanning by fast electrons. These times do not necessarily coincide with the times during which the voltages of the sources 31, 32 and 33 are applied to the layer 22 because, as is well known from the electron tube art, these voltages are not the only ones which control electron emission, other electrodes amongst those which constitute the electron-gun 11 generally being provided in order to enable said emission to be voluntarily inhibited.

It should be noted, too, that scanning of the target during the entire time of opening and closing of the shutter, although possible, is by no means essential for proper read-out. Scanning simply during a fraction of each of these phases will generally be quite adequate ; the possibility of several successive scans having the same or different durations as one another, extending over part of the duration of each of these phases or over the whole of such duration, is entirely feasible, the choice depending upon the thermal characteristics of the target.

In the example shown in FIG. 2, scanning with a slow ensuring beam is illustrated, corresponding to the switch of FIG. 1 being in the position 1 for around twenty milliseconds at the end of the open phase of the shutter, assuming that at the end of this phase threre is a reduction in the number of negative charges or an increase in the number of positive charges which has taken place at the point in question since the previous transit of this point by the beam. If this were not the case it would merely be necessary to exchange the places of the letters O and F in FIG. 2, for the diagram to retain its meaning.

The read-out signal is that appearing across the resistor 28 at the time of said slow electron scan. From experience gained by the applicant, this scanning will preferably occur just prior to the fast electron scan period and will only take place during a fraction of the shutter phase in which it occurs, as is the case in the example in FIG. 2. This slow electron scan function is represented by the single thick line at the centre of the diagram of FIG. 2.

In this same example, the fast electron scan function (switch in position 2) commences at the same time as the closed phase which follows the open phase of the shutter, and will continue for a hundred milliseconds.

From the foregoing it is evident that at the end of the fast electron scan function, the potential on the target will be fluctuating because of the inherent instabilities due to the secondary emission phenomenon. For this reason, the invention provides for the execution, after the relevant fast electron scan period and prior to the succeeding slow electron scan period which produces the read-out signal, of another short scanning of the target by a slow electron beam, this corresponding to position 3 of the switch 27 (voltages 33 < voltage 31, FIG. 2), in order to regulate the target potential.

In the example of FIG. 2, this scanning, which commences precisely at the instant at which fast electron scan ceases and is continued until the next phase appears, is represented by the single thick line at the righthand end of the central line of the diagram. Several other variant techniques are possible : this scanning could, for example, commence a certain time after the end of the fast electron scanning period, overlap into the next phase, etc. This latter case will necessarily apply if the fast electron scan period is continued up to the end of the phase F in the example of FIG. 2. All these variant approaches fall within the scope of the invention.

The voltage applied to the electrode 22 during the fast electron scan period and the current of the fast electron beam, are chosen so that the quantity of positive charges created on that face of the target scanned by the fast electrons, is greater than the quantity of negative charges which can appear on this face as a consequence of pyroelectric phenomenon throughout the entire separating the start of the shutter phase during which the fast electron beam is applied, from the instant at which said slow electron scan period commences.

In a general manner, it should be noted that although in the diagram of FIG. 2 an example of a possible cycle has been indicated, it goes without saying that various other cycles are equally possible within the framework of the invention, the sole condition characterizing the system of the invention being that short-period slow electron scanning after the end of the fast electron scan period is ensured, and indeed at least up to the commencement of that phase of the shutter cycle during which slow electron scan for read-out purposes takes place.

What I claim, is :

1. A camera system comprising a pyroelectric target exposed to incident radiation and read out by being scanned by a beam of slow read-out electrons, said scanning alternating with scanning by a fast electron beam in an alternation regulated in accordance with the cycle of a shutter arranged in front of the target and masking same from the incident radiation during the obturation phase of said cycle and uncovering it during the open phase, said slow electron scan occuring in one of said phases and the fast electron scan in the other, characterized in that means are provided to effect a second slow electron scan of said target after the end of the fast electron scan at least up to the commencement of that period of the shutter cycle during which the slow electron scan for read-out purposes takes place.

2. A camera system as claimed in claim 1, characterized in that the slow electron scan for read-out purposes is split up into several elementary scanning periods separated by intervals.

3. A camera system as claimed in claim 1, characterized in that said means consist of a switch connected in the supply circuit of said electron beams, and comprising three positions respectively corresponding to the slow read-out electron beam the fast electron beam and the second slow electron beam.

4. A camera system as claimed in claim 1 wherein said incident radiation in an infra-red radiation.

5. The camera system as claimed in claim 1 characterized in that the fast electron scan for read-out purposes is split into several elementary scanning periods separated by intervals.

* * * * *